United States Patent
Pawar et al.

(10) Patent No.: US 12,511,603 B2
(45) Date of Patent: Dec. 30, 2025

(54) SYSTEM AND METHOD FOR PROFILE MATCHING AND GENERATING GAP SCORES AND UPSKILLING RECOMMENDATIONS

(71) Applicant: ORACLE INTERNATIONAL CORPORATION, Redwood Shores, CA (US)

(72) Inventors: Dipawesh Pawar, Pune (IN); Krishnan Ramanathan, Bengaluru (IN); Jagdish Chand, Dublin, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 83 days.

(21) Appl. No.: 18/096,358

(22) Filed: Jan. 12, 2023

(65) Prior Publication Data
US 2024/0242162 A1    Jul. 18, 2024

(51) Int. Cl.
| | | |
|---|---|---|
| G06Q 10/06 | (2023.01) | |
| G06F 40/30 | (2020.01) | |
| G06Q 10/0631 | (2023.01) | |
| G06Q 10/0639 | (2023.01) | |

(52) U.S. Cl.
CPC ....... G06Q 10/06398 (2013.01); G06F 40/30 (2020.01); G06Q 10/063112 (2013.01)

(58) Field of Classification Search
None
See application file for complete search history.

(56) References Cited

U.S. PATENT DOCUMENTS

| | | | | |
|---|---|---|---|---|
| 2005/0222899 | A1* | 10/2005 | Varadarajan ... | G06Q 10/063112 705/7.14 |
| 2006/0265268 | A1* | 11/2006 | Hyder ............... | G06Q 10/1053 705/321 |
| 2019/0220824 | A1* | 7/2019 | Liu ................. | G06Q 10/063112 |
| 2022/0343257 | A1* | 10/2022 | Mohanty ............. | G06F 40/30 |
| 2022/0406207 | A1* | 12/2022 | Celano .............. | G09B 5/02 |
| 2024/0249831 | A1* | 7/2024 | Jesneck ............. | G16H 40/20 |

OTHER PUBLICATIONS

Fasttext, "English word vectors"; retrieved on Dec. 28, 2022; 3 pages, retrieved from <https://fasttext.cc/docs/en/english-vectors.html>.

(Continued)

*Primary Examiner* — Alan Torrico-Lopez
(74) *Attorney, Agent, or Firm* — TUCKER ELLIS LLP (57) ABSTRACT

Embodiments described herein are generally related to computer data analytics, and computer-based methods of providing business intelligence data, and are particularly related to systems and methods for use with enterprise data for profile matching and generating gap scores and upskilling recommendations. In accordance with an embodiment, the system can operate to match a set of position requirements with candidate attributes or skillsets, ranking them on the basis of match scores. The system can be used, for example, to determine a skill gap between the position requirements and candidate attributes, and recommend which skills might be augmented to better address the position requirements.

19 Claims, 10 Drawing Sheets

(56) References Cited

OTHER PUBLICATIONS

TensorFlow Hub, "Universal Sentence Encoder", retrieved on Dec. 28, 2022, 5 pages, retrieved from <https://tfhub.dev/google/universal-sentence-encoder/4>.

Levy, Omer et al., "Linguistic Regularities in Sparse and Explicit Work Representations", Proceedings of the Eighteenth Conference on Computational Language, Baltimore, Maryland Jun. 26-27, 2014, © 2014 Association for Computational Linguistics, pp. 171-180.

* cited by examiner

SYSTEM AND METHOD FOR PROFILE MATCHING AND GENERATING GAP SCORES AND UPSKILLING RECOMMENDATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and to systems and methods for use with enterprise data for profile matching and generating gap scores and upskilling recommendations.

BACKGROUND

In today's job market, not only are there many job openings posted during a typical day, but there may also be many job seekers looking for available positions. In such an environment, it may be difficult for recruitment teams and job seekers to determine, respectively, suitable candidates or suitable positions, while saving time and resources in achieving their objectives.

Screening tools can be useful in providing a shortlist of candidates for open positions, for example to help an organization obtain a view of positions which internal candidates can potentially fill, or determine potential skill gaps with respect to the organization as a whole.

SUMMARY

Embodiments described herein are generally related to computer data analytics, and computer-based methods of providing business intelligence data, and are particularly related to systems and methods for use with enterprise data for profile matching and generating gap scores and upskilling recommendations.

In accordance with an embodiment, the system can operate to match a set of position requirements with candidate attributes or skillsets, ranking them on the basis of match scores. The system can be used, for example, to determine a skill gap between the position requirements and candidate attributes, and recommend which skills might be augmented to better address the position requirements.

DETAILED DESCRIPTION

Data analytics enables the computer-based examination or analysis of large amounts of data, in order to derive conclusions or other information from that data; while business intelligence tools provide an organization's business users with information describing their enterprise data in a format that enables those business users to make strategic business decisions.

Examples of various types of data and data analytics of interest to organizations include those related to Enterprise Resource Planning (ERP), Human Capital Management (HCM), Customer Experience (CX), Supply Chain Management (SCM), Enterprise Performance Management (EPM), or other types of data and data analytics use cases.

Embodiments described herein are generally related to systems and methods for use with enterprise data for profile matching and generating gap scores and upskilling recommendations.

In today's job market, not only are there many job openings posted during a typical day, but there may also be many job seekers looking for available positions. In such an environment, it may be difficult for recruitment teams and job seekers to determine, respectively, suitable candidates or suitable positions, while saving time and resources in achieving their objectives.

Screening tools can be useful in providing a shortlist of candidates for open positions, for example to help an organization obtain a view of positions which internal candidates can potentially fill, or determine potential skill gaps with respect to the organization as a whole.

Embodiments described herein are generally related to computer data analytics, and computer-based methods of providing business intelligence data, and are particularly related to systems and methods for use with enterprise data for profile matching and generating gap scores and upskilling recommendations.

In accordance with an embodiment, the system can operate to match a set of position requirements with candidate attributes or skillsets, ranking them on the basis of match scores. The system can be used, for example, to determine a skill gap between the position requirements and candidate attributes, and recommend which skills might be augmented to better address the position requirements.

In accordance with an embodiment, in addition to shortlisting candidates for particular jobs, the system can be used, for example, to assess in-house talent with respect to skill gaps, upskilling requirements, strengths and weakness among teams, succession management, or distribution of match profiles.

One of the challenges involved in matching position requirements with candidate attributes or skillsets includes the complex nature of natural language. For example, a same skill can be described in multiple ways.

In accordance with an embodiment, to accommodate such environments, a position/candidate matching process can scale with regard to the number of candidates to be matched per job posting, and the hierarchical nature of some of the profile attributes. For example if, for a particular position, candidates are required to have at least a Bachelor's degree, then, taking a degree hierarchy into account, candidates having a higher-level Master's degree or a Doctoral degree should also be considered.

Data Analytics Environments

Figure 1:
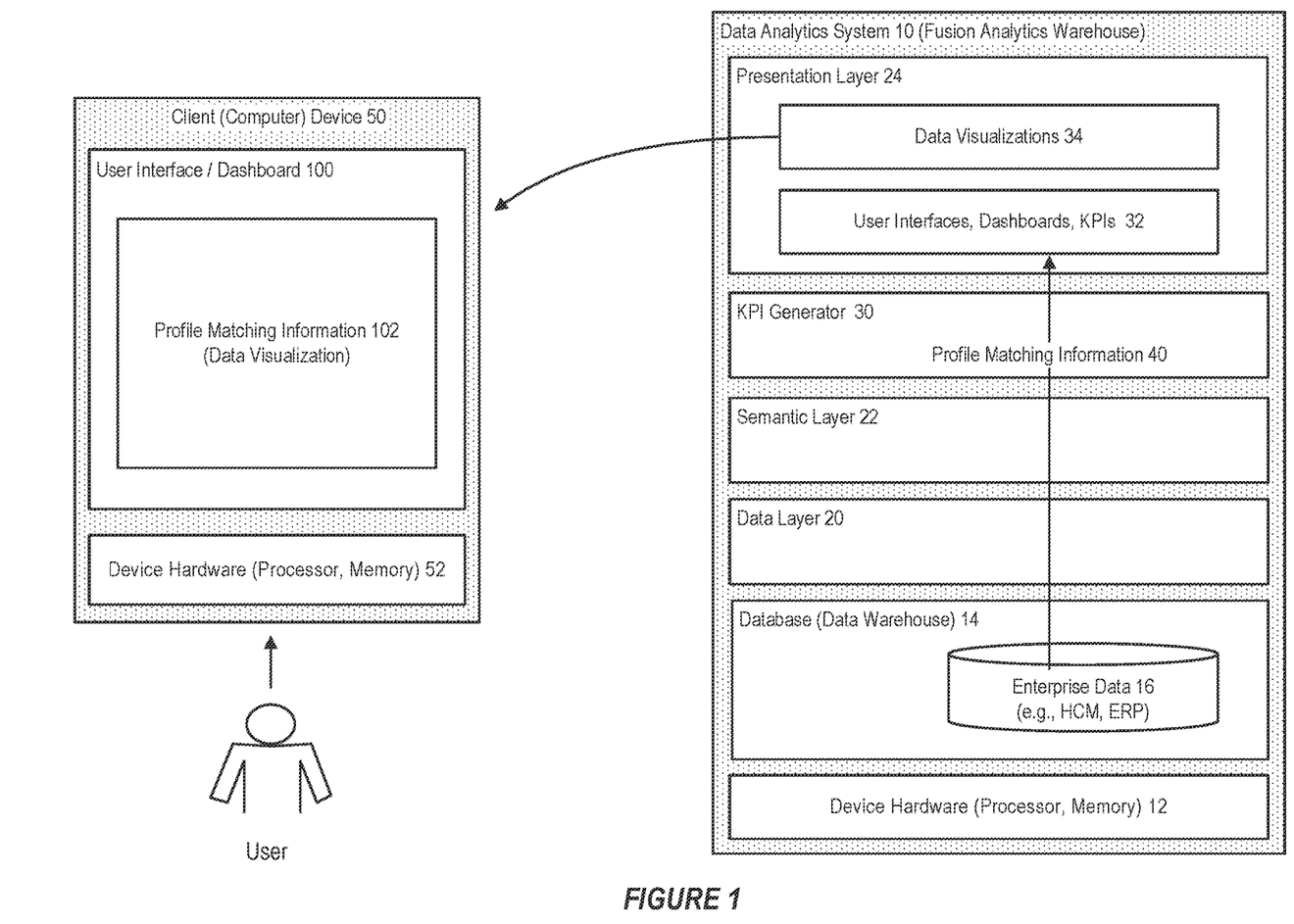
FIG. 1 illustrates a system for use with enterprise data for profile matching and generating gap scores and upskilling recommendations, in accordance with an embodiment.

FIG. 1 illustrates a system for use with enterprise data for profile matching and generating gap scores and upskilling recommendations, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics environments.

As illustrated in FIG. 1, in accordance with an embodiment, a data analytics system 10, which can include one or more computer device hardware (e.g., processor, memory) 12, can provide access to a database 14 (data warehouse) of enterprise data 16, including data descriptive of persons and roles (e.g., jobs) within an organization. Enterprise databases can operate as data sources that provide data used for creation of key performance indicators (KPI's).

In accordance with an embodiment, a data analytics system and/or database may be provided at a server such as of one or more general purpose server computers, or specialized server computers, data analytics system or environment, such as, for example, an Oracle Fusion Analytics Warehouse (FAW) or Oracle Cloud HCM environment.

In accordance with an embodiment, the data analytics system can include one or more layers or components, such as, for example, a data layer 20, semantic layer 22, and presentation layer 24; and a KPI generator 30 that enables generation of data metrics for use in one or more user interfaces, dashboards or KPI's 32, or data visualizations 34.

In accordance with an embodiment, in a multi-tenant data analytics environment, a data warehouse can include, for each tenant or customer, a customer schema associated with their enterprise data environment. Each tenant/customer can be additionally provided access to a data analytics schema which can be updated, for example, by an extract, transform, and load (ETL) process, on a periodic or other basis.

In accordance with an embodiment, the data layer can include a data pipeline or process operable to extract data from business applications or databases provisioned in the environment, and transform extracted data into a model format suitable for loading into a customer schema of a data warehouse instance.

In accordance with an embodiment, various tenants/customers of a data analytics environment may have different requirements with regard to how their data is classified, aggregated, or transformed, for purposes of providing data analytics. To support such different requirements, the semantic layer can include data defining a semantic model of a customer's data; which is useful in assisting users in understanding and accessing that data using commonly-understood business terms; and provide custom content to the presentation layer.

In accordance with an embodiment, a semantic model can be defined, for example, in an Oracle environment, as a BI Repository (RPD) file, or other metadata that defines logical schemas, physical schemas, physical-to-logical mappings, aggregate table navigation, and/or other constructs that implement aspects of the semantic model.

In accordance with an embodiment, the presentation layer can enable access to the data content using, for example, a software analytic application, user interface, dashboard, key performance indicators (KPI's), or other type of report or interface.

In accordance with an embodiment, the range of KPIs can include metrics or data comprising profile matching information 40, including for example, gap scores, and/or upskilling recommendations, or other attributes associated with persons within an organization.

In accordance with an embodiment, the system can be accessed by user using a client (computer) device 50, which can include one or more computer device hardware (e.g., processor, memory) 52, and can communicate with the data analytics system via a network.

For example, in accordance with an embodiment, a client device may provide a graphical user interface that enables a user of the client device to interact with the client device, and provides or outputs information to the user. Examples of client devices can include various types of computing systems, such as computer devices, or portable handheld devices. The client device can communicate with the data analytics system by a network that can support data communications between computers using any of a variety of network protocols.

In accordance with an embodiment, in response to a request to display profile matching information within the organization, the system can receive, from the database, data associated with the persons and roles (jobs) in accordance with one or more KPIs; and generate, for display at a user interface or dashboard 100, in connection with the profile matching, gap scores, upskilling recommendations, or other profile matching information 102, for example as a two-dimensional matrix, table, chart, or other data display or visualization format.

For example, in accordance with an embodiment, a request can be received via a client application and user interface, and communicated to the analytics system, e.g., via a cloud service. The system can retrieve an appropriate dataset using, e.g., SELECT statements or instructions, for use in generating and returning the requested data analytics or visualization information to the client.

In accordance with an embodiment, the components and processes illustrated in FIG. 1, and as further described herein with regard to various other embodiments, can be provided as software or program code executable by a computer system or other type of processing device. Various application and storage-related functionalities described herein can be offered as services via a cloud environment, wherein a cloud network can facilitate communication and exchange of data between client devices and a cloud computing or cloud infrastructure system.

Profile Matching

Figure 2:
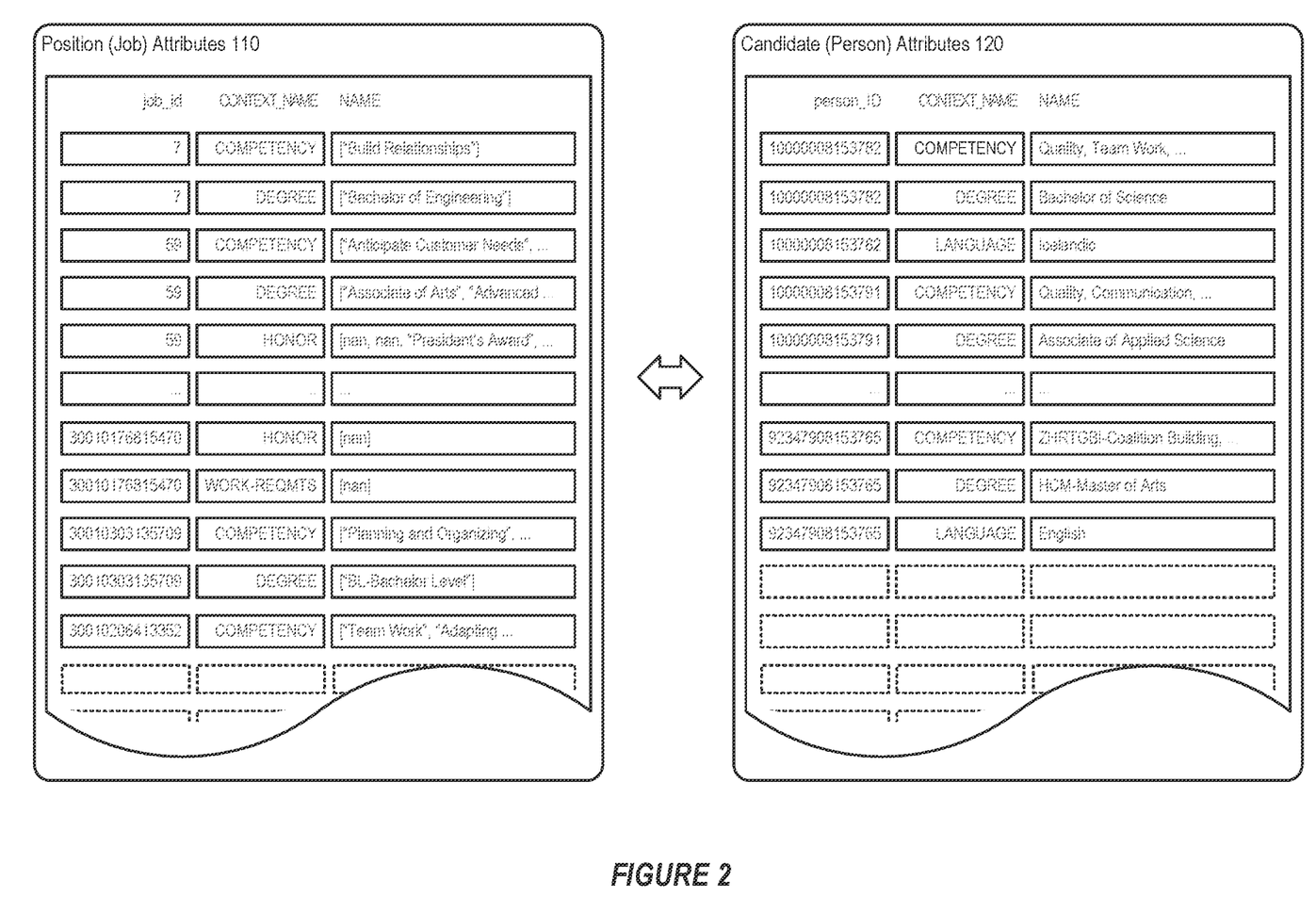
FIG. 2 illustrates an example data for use in profile matching, in accordance with an embodiment.
Figure 3:
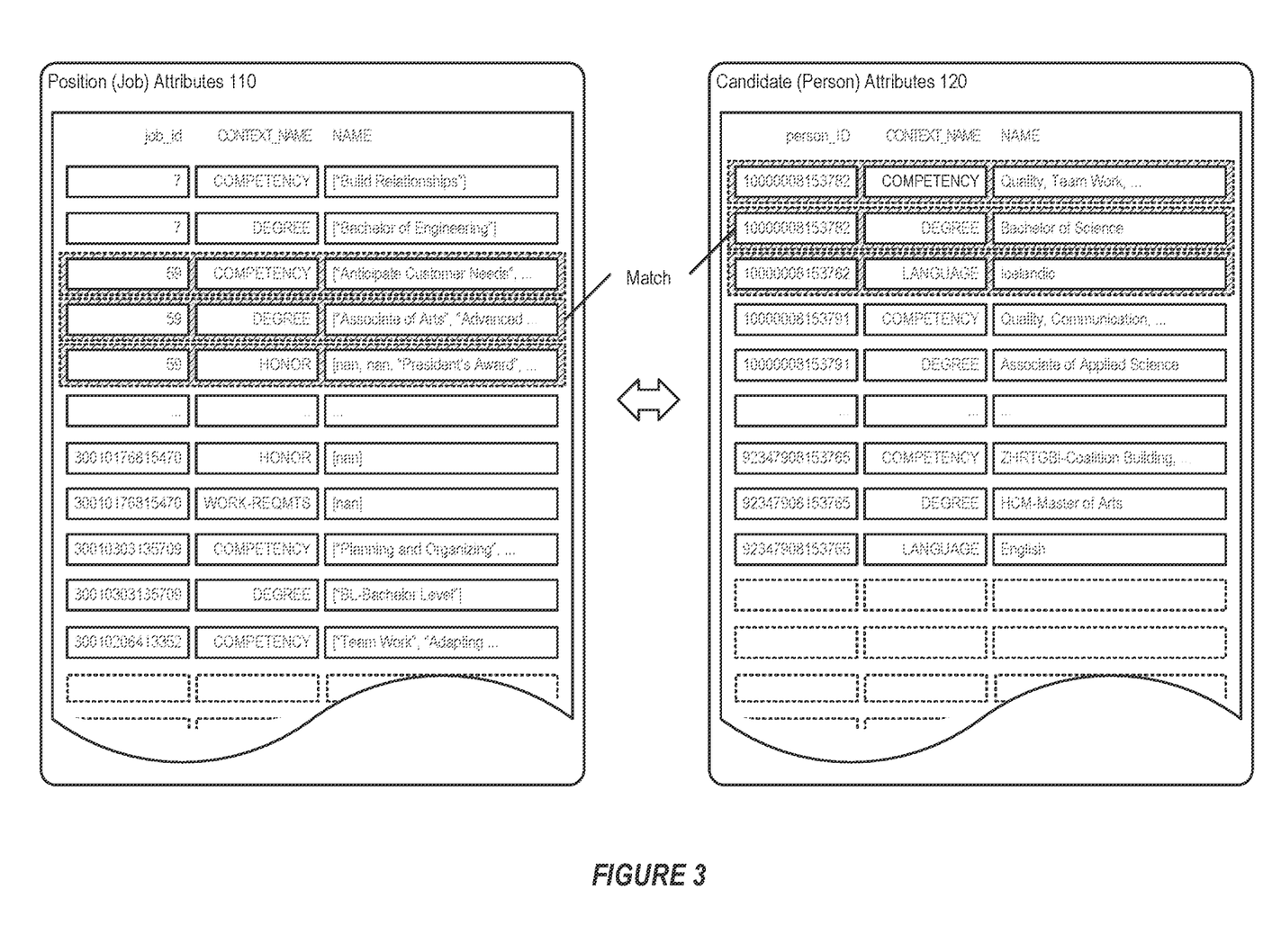
FIG. 3 further illustrates an example data for use in profile matching, in accordance with an embodiment.

FIGS. 2-3 illustrates an example table of data for use in profile matching, in accordance with an embodiment.

As illustrated in FIGS. 2-3, in accordance with an embodiment, an organization's enterprise data can include a plurality of position (job) attributes 110, a set of which can be selectively matched as position requirements with a plurality of candidate (person) attributes 120. For example, data indicative of position (job) attributes and the candidate (person) attributes can be stored as a plurality of tables of data within the enterprise database of a data analytics system as described above, and used as inputs to a position/candidate matching process.

In accordance with an embodiment, the position/candidate matching process is designed to accommodate the complex nature of natural language—including that position requirements and candidate attributes or skillsets can be described in various ways. Additionally, the position/candidate matching process can scale with regard to the number of candidates to be matched per job posting, and where appropriate the hierarchical nature of various profile attributes. For example if, for a particular position, candidates are required to have at least a Bachelor's degree, then, taking a degree hierarchy into account, candidates having a higher-level Master's degree or a Doctoral degree should also be considered.

In accordance with an embodiment, the position/candidate matching process provides a multi-step approach to profile matching comprising, for example:

1. Pre-processing position (job) requirements, and candidate (person) skills.
2. Transforming position requirements and candidate skills to semantic vector representations.
3. Computing, for each candidate of a plurality of candidates, a match score for that candidate.
4. Computing, for each candidate of the plurality of candidates, a skill gap score for that candidate.
5. Generating profile matching information or data visualizations, and/or optionally determining, for one or more candidates, upskilling requirements for use in providing upskilling recommendations.

Figure 4:
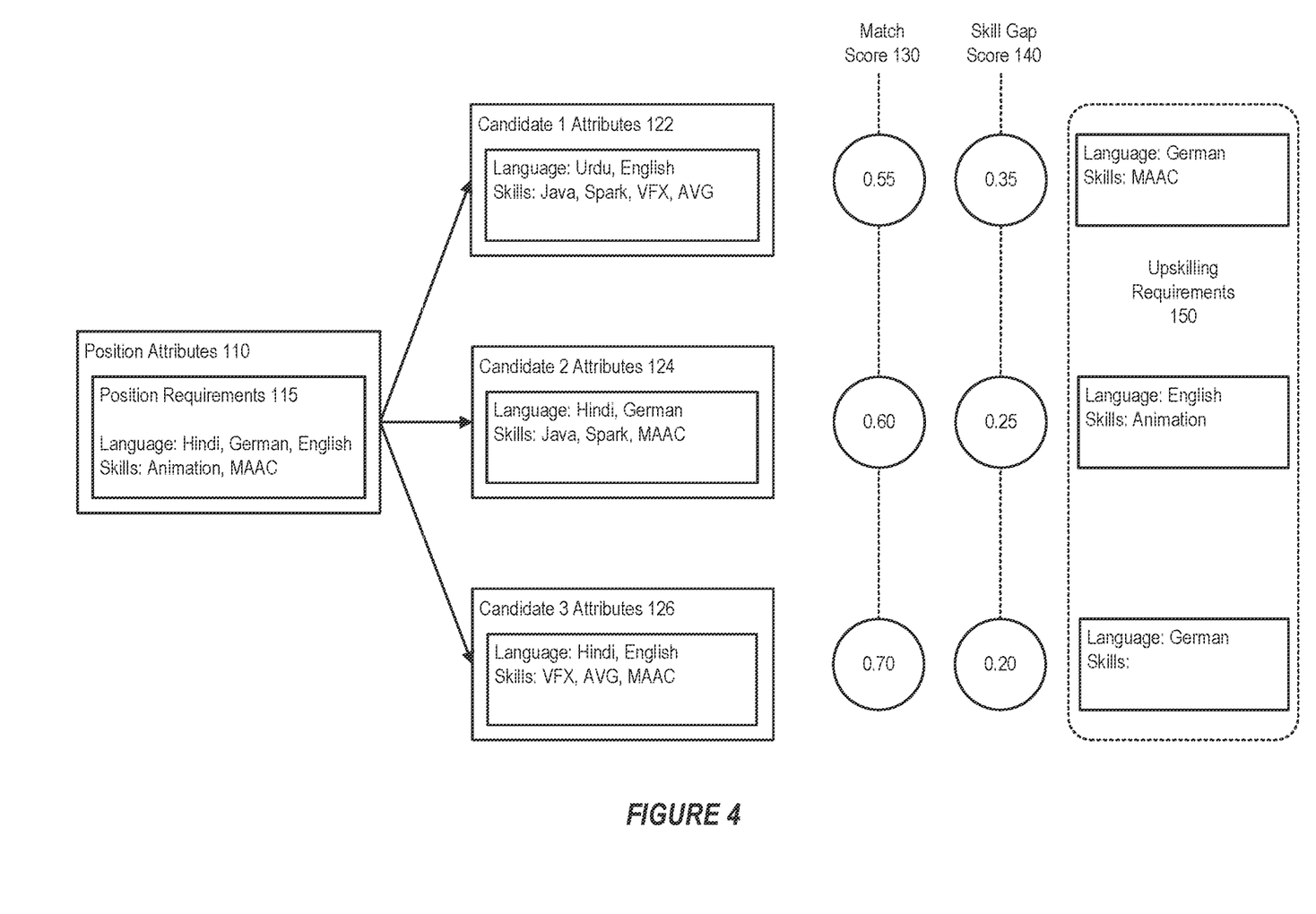
FIG. 4 illustrates example inputs and outputs to a position/candidate matching process, in accordance with an embodiment.

FIG. 4 illustrates example inputs and outputs to a position/candidate matching process, in accordance with an embodiment.

As illustrated in FIG. 4, in accordance with an embodiment, the system can determine, for a particular position (job), from within the position attributes, a set of position requirements 115—in this example that a candidate's attributes should preferably include language abilities in Hindi, German, and/or English; and that their skills should preferably include Animation and/or a MAAC (Academy of Advanced Cinematics) qualification.

In accordance with an embodiment, the system can determine, for each of a plurality of candidates 122, 124, 126, a match score 130, skill gap score 140, and where applicable one or more upskilling requirements 150 for the candidate.

In accordance with an embodiment, the natural language description of position requirements and candidate attributes can be pre-processed to remove unwanted whitespaces, unwanted characters such as [',', ';', '.', '(',')', '[',']', '/', '"'], or invalid content values such as ~No Value~.

As illustrated in FIG. 4, when applying the position/candidate matching process to the three candidates illustrated therein, taking into account the position requirements and the attributes or skillsets for each candidate, the system determines for Candidates 1, 2, and 3 respectively, match scores of 0.55, 0.60, and 0.70; skill gap scores of 0.35, 0.25, and 0.20; and one or more upskilling requirements for the candidate.

Figure 5:
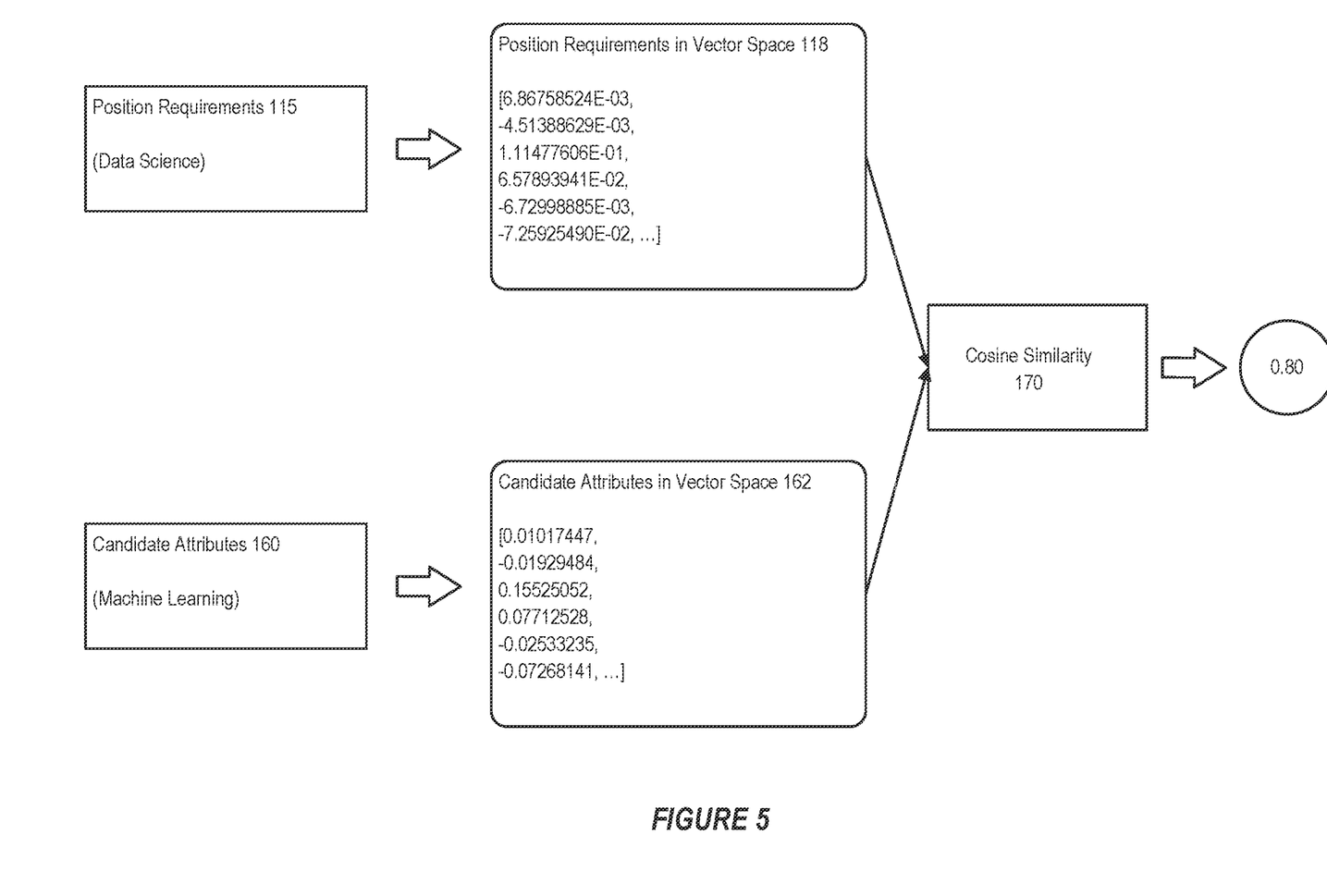
FIG. 5 illustrates an example mapping of position requirements and candidate attributes/skills to semantic vector representations, in accordance with an embodiment.

FIG. 5 illustrates an example mapping of position requirements and candidate attributes/skills to semantic vector representations, in accordance with an embodiment.

As illustrated in FIG. 5, in accordance with an embodiment, the system operates to transform both the set of position (job) requirements, and one or more candidate/person attributes 160 or skills, to semantic vector representations or embeddings, including a position requirements in a vector space representation 118, and a candidate attributes in a vector space representation 162, for use in applying a cosine similarities function 170.

Since same requirements/skills can be specified in different ways, a mere word-to-word matching may not be able to accurately score and rank candidates having similar sets of skills but having used synonymous words, short forms, correlated or other/different terms, to specify those skills.

For example, consider an available job for which the position requirements indicate that candidates should preferably have expertise in Machine Learning. In their listing of skills, candidates may have specified Data Science, or Artificial Intelligence, which are closely-related concepts. Candidates may have alternately specified short descriptive forms such as ML, or AI, which further increases the complexity. An additional aspect that can complicate the matching process is when both the job requirements and person skills are closely related but have little or no overlapping terminologies.

For example, the position requirements may mention animation as a requirement, and a person may have worked on visual effects (VFX), or AVG, which are animation technologies. In another example, the position requirements may require a candidate to know Hindi, and one of the candidates knows Urdu. As the underlying semantics of both of these examples are quite close, the position/candidate matching process should score this candidate higher than others. Such scenarios encourage the position/candidate matching algorithm to be adaptable to derive relationships among variations in terminologies. Semantic vector representations, popularly referred as embeddings, are proven to have such capability of entailing relationships.

In accordance with an embodiment, the position/candidate matching process accommodates natural language intricacies by mapping requirements/skills to semantic vector space using a combination of, e.g., Fastext and/or Universal Sentence Encoder (USE) embeddings. Such a combination provides an advantage of having requirements/skills appearing in a similar context close to each other in semantic vector space. For example, a library such as Fastext enables sub-word information and meaningful embeddings even for unseen, mis-spelled words. For single vector representation for multi-word terminology, an average of vectors of each individual words needs to be taken. To accommodate this, a sentence encoder such as Universal Sentence Encoder captures sequential aspects of multi-word terminologies. For example, an embedding for "machine learning" should have some variance with respect to embedding for "learning machine".

Match Score Computation

Figure 6:
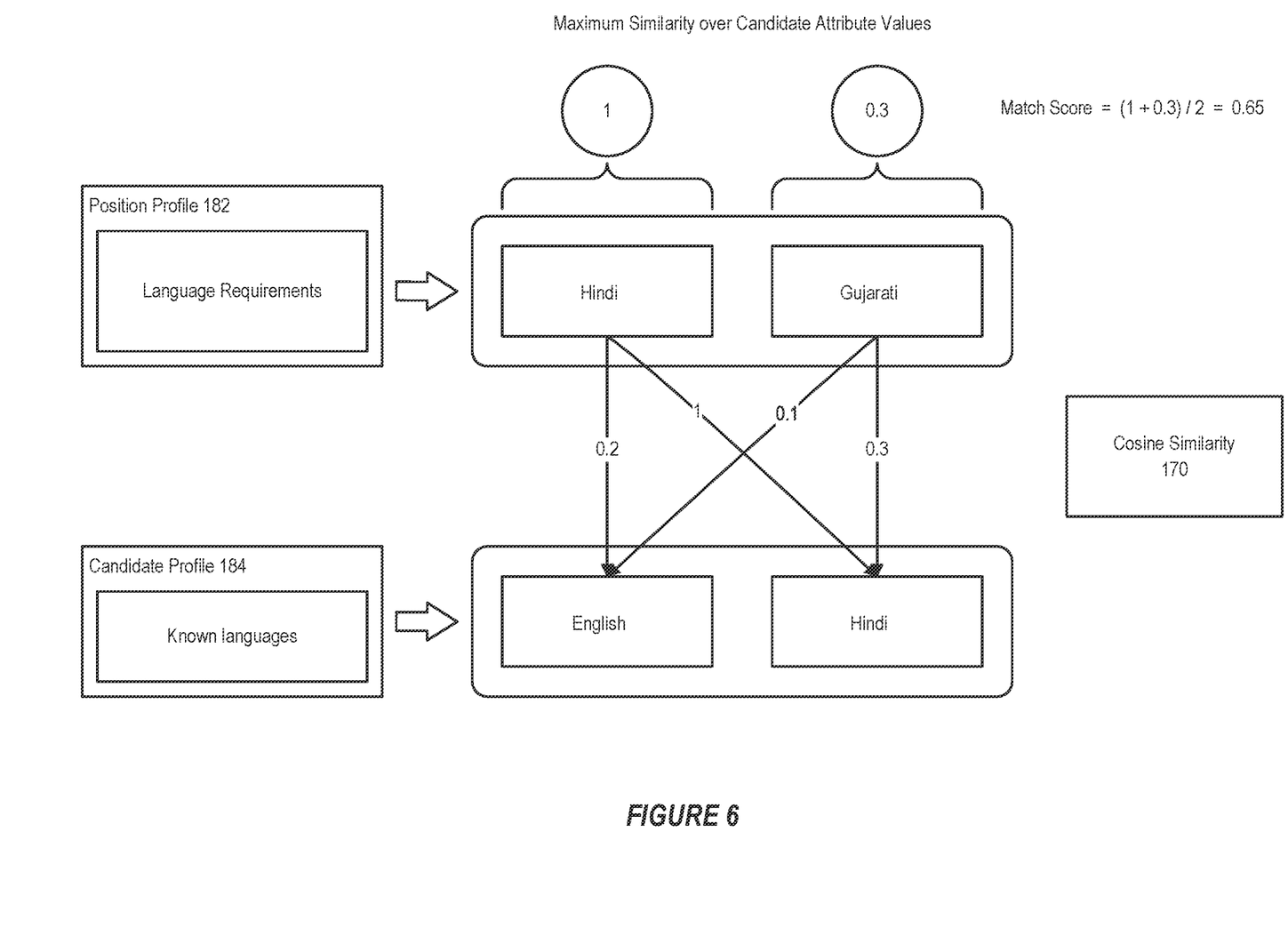
FIG. 6 illustrates an example match score computation, in accordance with an embodiment.

FIG. 6 illustrates an example match score computation, in accordance with an embodiment.

As illustrated in FIG. 6, in accordance with an embodiment, a computed match score can be used to denote or indicate how well a particular position (job) profile 182 and candidate (person) profile 184 fits each other; the higher the match score, the higher the goodness of fit.

For example, in accordance with an embodiment, input files may provide for job profiles and person profiles a plurality of attributes such as Degree, Language, Competency, Certification, Membership, Honors and Work Requirements.

In order to compute a match between job and person, the system can first compute match scores for each attribute. An overall match score is then determined as a weighted sum of attribute match scores. The use of such weights allows the system to associate a higher priority to some attributes over other attributes.

In accordance with an embodiment, an attribute match score is computed as average of maximum similarities of each job profile attribute value (requirements) over all person profile attribute values (skills) wherein a similarity between two values is evaluated as the cosine similarity (1—cosine distance) between their semantic vector representations.

In accordance with an embodiment, the assessment of maximum similarity is preferred over an averaging of similarities, since average similarity is prone to being skewed towards a greater number of non-matching or some of the highly matching attribute values. The use of maximum similarity also prevents persons with more values from receiving a competitive advantage over those with lesser values and vice-versa.

Figure 7:
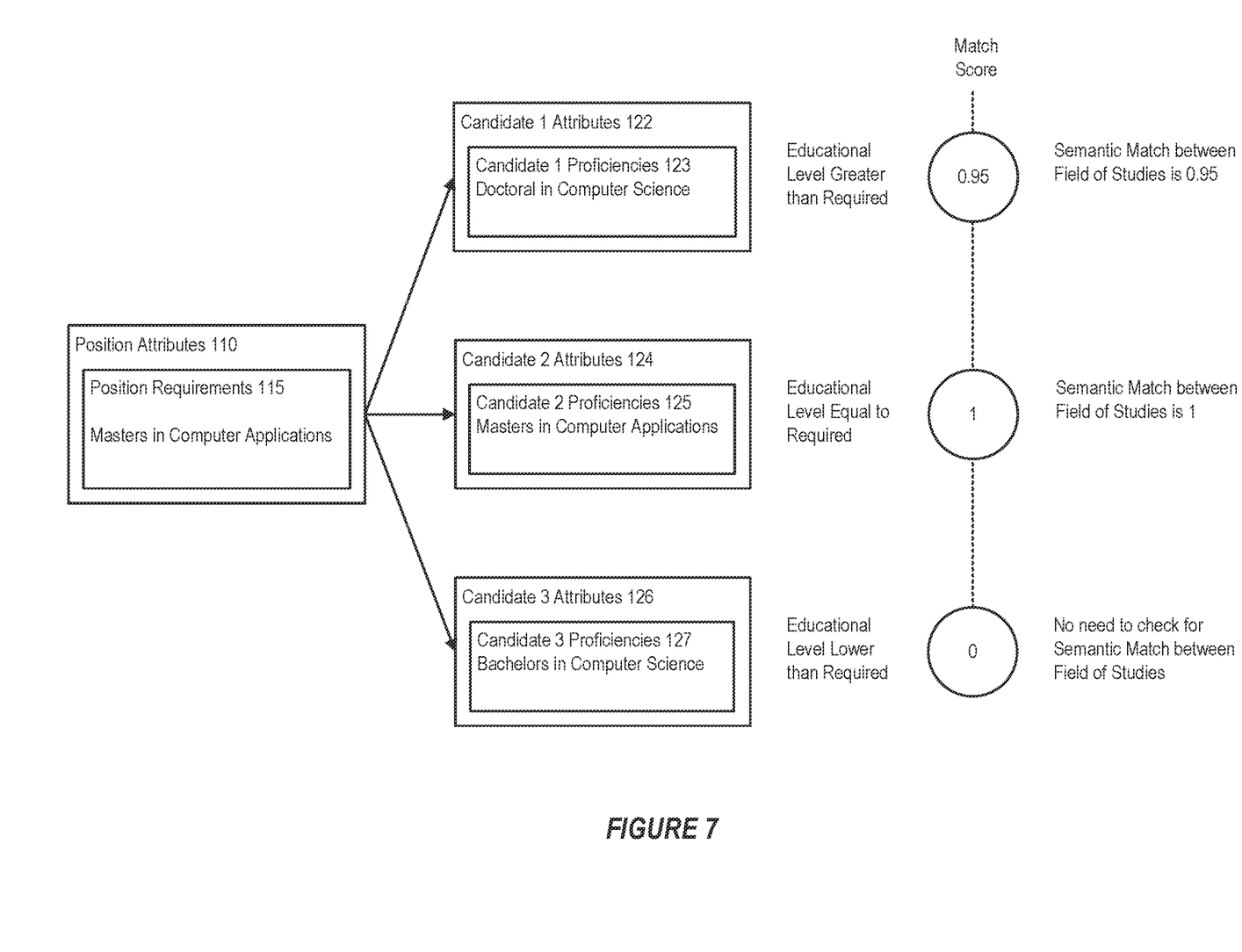
FIG. 7 illustrates another example match score computation, in this example directed to degrees awarded to candidates, in accordance with an embodiment.

For example, Table 1 illustrates examples of computing match scores using either a maximum similarity or average similarly, including some cases wherein the use of an average similarity for purposes of computing a match score might result in unintended results.

consider only those person profiles which fulfil or better the job requirements educational level. In such an example, the system can first check the educational level that the job requires; if a person has an educational level equal or higher to it then semantic vector-based matching (as described above) is performed on the field of study. If the person has a lesser educational level than the job requires, their match score is returned as zero.

Skill Gap Score Computation

Figure 8:
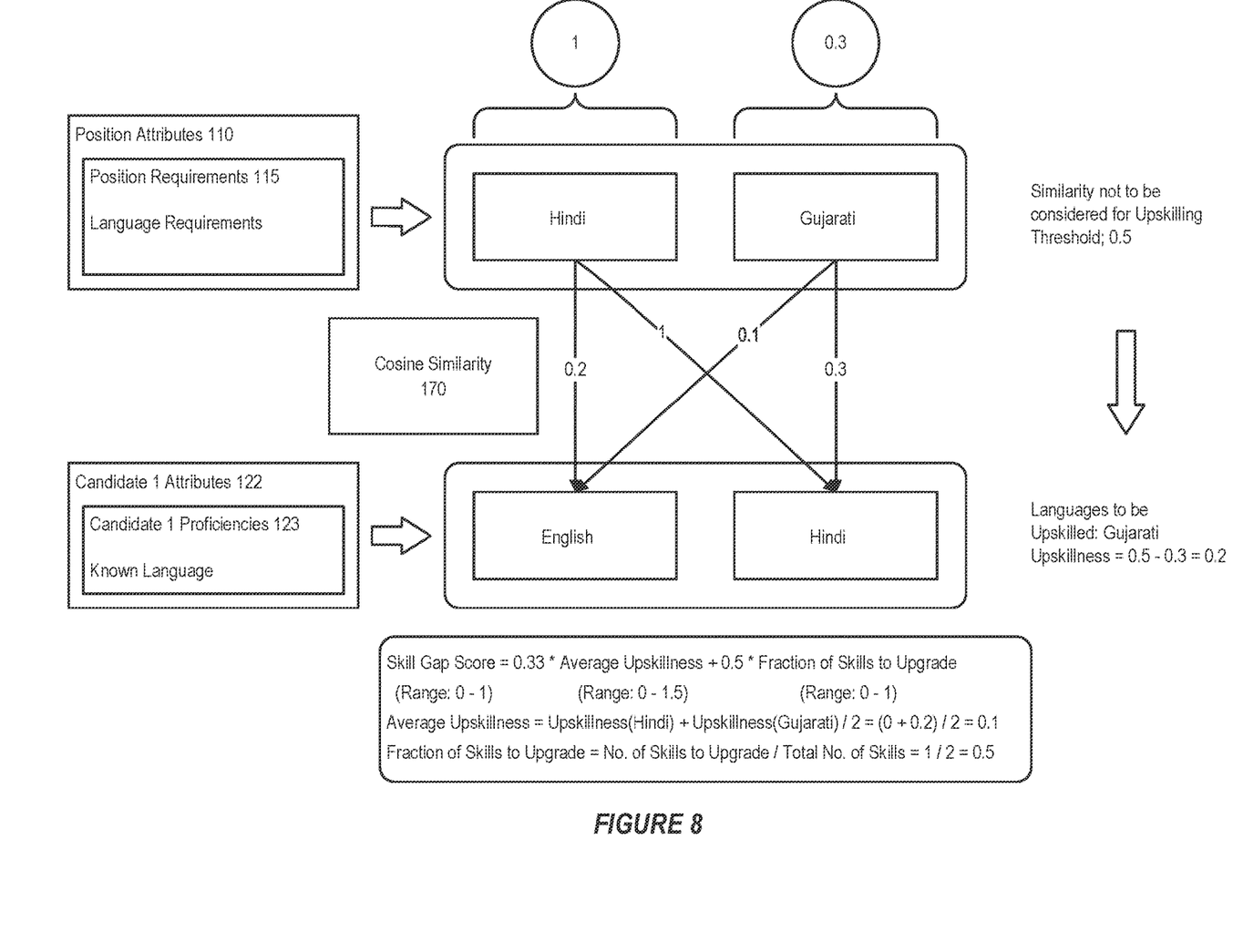
FIG. 8 illustrates an example skill gap score and upskilling requirements computation, in accordance with an embodiment.

FIG. 8 illustrates an example skill gap score and upskilling requirements computation, in accordance with an embodiment.

In accordance with an embodiment, a skill gap score quantifies the gap between position (job) requirements and candidate attributes or skills, and provides a mechanism to compare profiles. Even pairs with higher match scores may have some gaps to close. A skill gap score can be defined as:

$$\text{Skill Gap Score} = w_1 \times \frac{\sum_{i=0}^{N} Ui}{N} + w_2 \times N_u/N$$

Wherein w (e.g., $w_1$, $w_2$) represents a weight, U represents upskilling, and N represent the number of job profile attribute values to be considered.

TABLE 1

| Case # | Candidate (Person) | Position Profile Attribute Value similarities over Candidate Profile Attribute Values | Attribute Match Score using Maximum Similarity | Attribute Match Score using Average Similarity | Ideal Match |
| --- | --- | --- | --- | --- | --- |
| Case 1: Averaging reducing match score for person with more values | Person 1<br>Person 2 | 0.7, 0.8, 0.9<br>0.9 | 0.9<br>0.9 | 0.8<br>0.9 | Both persons are an equal match |
| Case 2: Averaging skews score to less matching skills | Person 1<br>Person 2 | 0.1, 0.2, 0.1, 0.9<br>0.2, 0.3, 0.8 | 0.9<br>0.8 | 0.325<br>0.433 | Person 1 |
| Case 3: Greater number of matching skills influence averaging | Person 1<br>Person 2 | 0.7, 0.8, 0.7<br>0.8, 0.3 | 0.8<br>0.8 | 0.733<br>0.5 | Both persons are an equal match |

In accordance with an embodiment, each attribute match score ranges between (negative) −1 and (positive) 1, since it depends upon cosine similarity. Since the final match score is an average of these attribute match scores, it also ranges between (negative) −1 and (positive) 1; wherein a value of −1 would indicate a complete mis-fit, whereas a value of 1 would indicate a complete fit.

FIG. 7 illustrates another example match score computation, in this example directed to degrees awarded to candidates, in accordance with an embodiment.

As illustrated in FIG. 7, in this example, an attribute of "Degrees" contains two types of information: a level of education like Bachelor's, Master's, or Doctoral; and a field of study like computer science, medical, or arts.

In accordance with an embodiment, the system determines for Candidates 1, 2, and 3 respectively, proficiencies 123, 125, 127, including educational level. A semantic vector representation might not be able to compare degrees according to level information, and it may be useful to also In accordance with an embodiment, a first component is average upskill-ness that a person profile needs in order to be suitable for the job profile requirements computed over job profile attribute values.

In accordance with an embodiment, to compute upskill-ness for a job profile attribute value, an upskill-ness threshold T is defined. When the maximum similarity (MS) for a job profile attribute value over all person profile attribute value is less than this threshold T, then the person lacks that particular job requirement and upskill-ness would be T−MS. If the maximum similarity (MS) for a job profile attribute is more than or equal to T, then the upskill-ness would be zero.

In accordance with an embodiment, a second component is fraction of job profile attributes for which the candidate person should upgrade in order to be suitable for a particular position or job. An amount Nu is number of values for which upskilling is required out of all values (N).

In the above example, the first component compensates for scenarios where for person, upskilling, though of miniscule level, is required for quite a lot of job requirements, whereas for other, it's required, though of bigger scale, only for small number of job requirements. In such scenario, it may happen that the skill gap score is more for second person to first one. Though this is not incorrect, it may be useful to provide some weight toward the number of job requirements for which upskilling is required, which is provided by the second component.

In accordance with an embodiment, job requirements with upskill-ness less than an upskill-ness threshold T, are considered as requirements for which the person needs to upskill. Desirable properties of the position/candidate matching process include that equal size skill sets, belonging to different persons, that are completely overlapping with job requirements, are scored the same.

For example, if a particular position requires ['python', 'machine learning', 'spark'] then candidates with ['python', 'spark'] or with ['machine learning', 'spark'] should have the same scores.

In accordance with an embodiment, skill sets that are completely overlapping with job requirements, should score more than those that are not completely overlapping.

For example, if a particular position requires ['python', 'machine learning', 'spark'], then candidates with ['machine learning', 'spark'] (completely overlapping) should score more than candidates with ['data science', 'spark'].

In accordance with an embodiment, an additional skill which is not required for a particular position should not affect the candidate's match score.

For example, if a particular position requires ['python', 'machine learning', 'spark'], then candidates with ['machine learning', 'spark', 'Java'] should not score more than candidates with ['machine learning', 'spark'].

In accordance with an embodiment, the matching process can be used, for example, to find a closest similar person skill for each job attribute. Additional skills, or irrelevant skills, do not received favored treatment when calculating the match score.

Upskilling Requirements Computation

Figure 9:
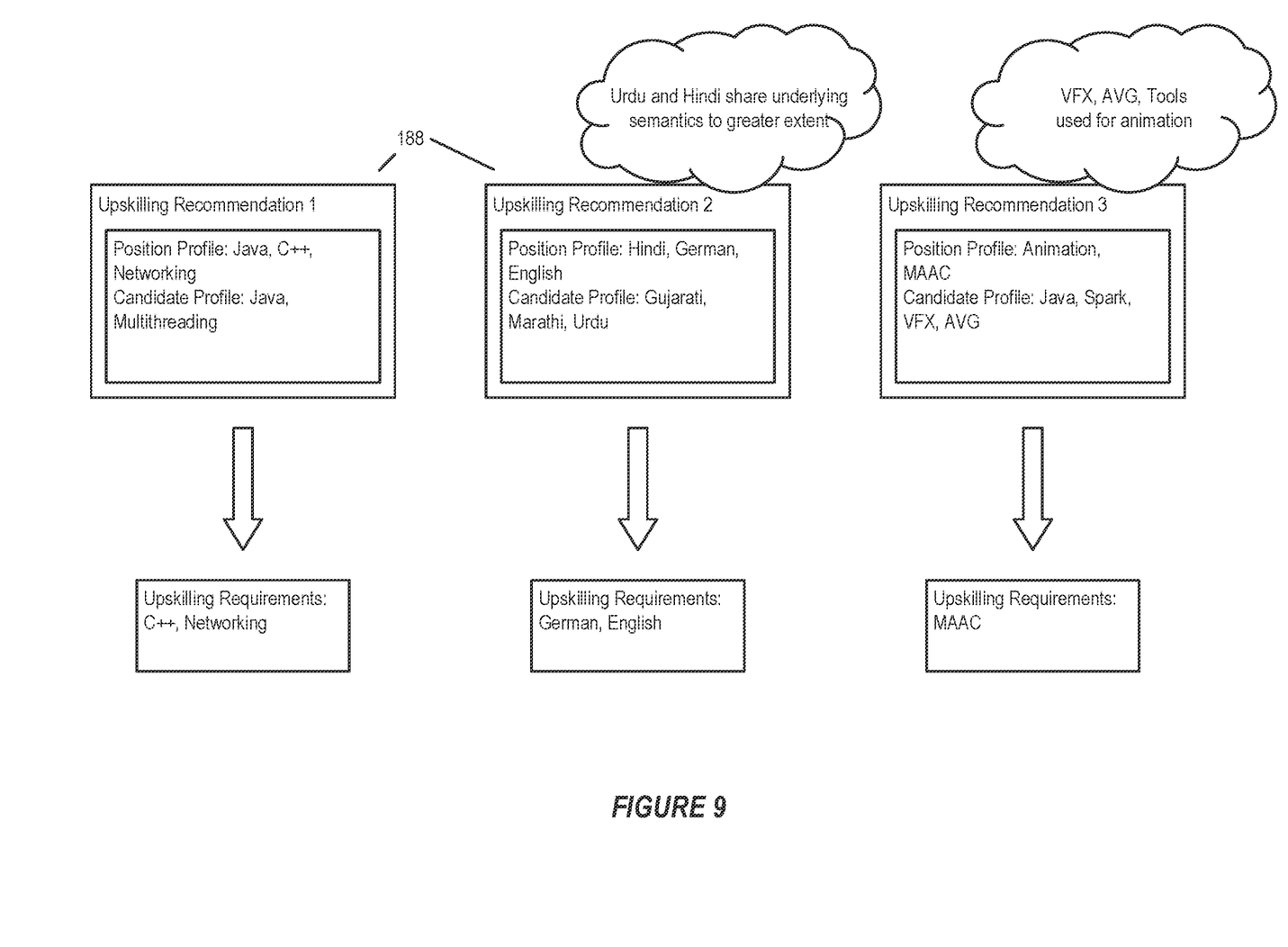
FIG. 9 illustrates an example of the system can be used to generate upskilling recommendations, in accordance with an embodiment.

FIG. 9 illustrates an example of the system can be used to generate upskilling recommendations, in accordance with an embodiment.

As illustrated in FIG. 9, the system operating a position/candidate matching process can be used to determine a skill gap between job requirements and person skills, using the above processes, and generate, display, or output recommendations 188, or otherwise recommend skills which a person should upgrade in order to be able to fulfill job requirements.

Position/Candidate Matching Process

Figure 10:
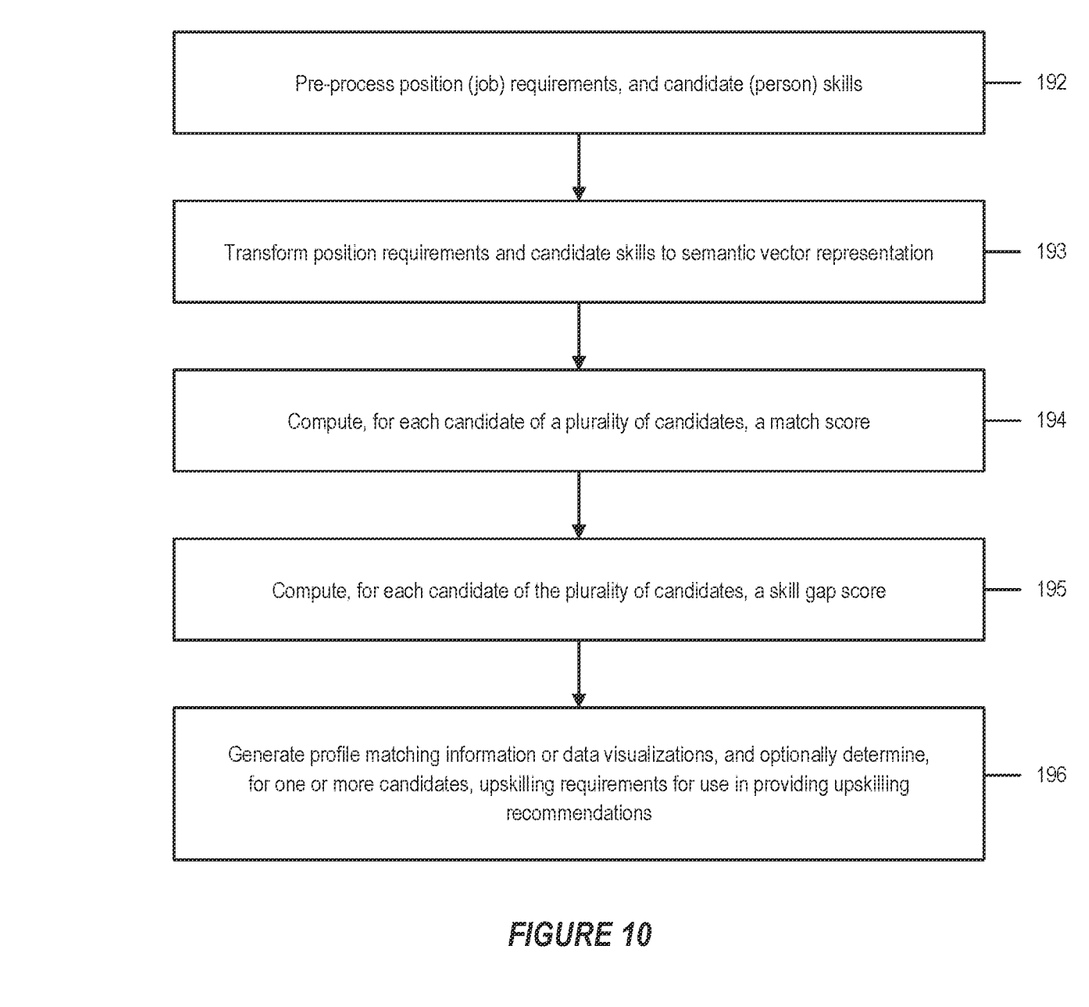
FIG. 10 illustrates a method for use with enterprise data, for profile matching and generating gap scores and upskilling recommendations, in accordance with an embodiment.

FIG. 10 illustrates a method for use with enterprise data, for profile matching and generating gap scores and upskilling recommendations, in accordance with an embodiment.

As illustrated in FIG. 10, in accordance with an embodiment at step 192, the system operates to pre-process position (job) requirements, and candidate (person) skills.

At step 193, the system operates to transform position requirements and candidate skills to semantic vector representations.

At step 194, the system operates to compute, for each candidate of a plurality of candidates, a match score.

At step 195, the system operates to compute, for each candidate of the plurality of candidates, a skill gap score.

At step 196, the system operates to generate profile matching information or data visualizations, and optionally determine, for one or more candidates, upskilling requirements for use in providing upskilling recommendations.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A system for use with enterprise data for profile matching and generating gap scores and upskilling recommendations, comprising:
   a data analytics system, including a computer device hardware comprising a processor and memory, that provides access to an enterprise database of enterprise data, including data descriptive of position requirements and candidate attributes or skillsets within an organization;
   wherein the data analytics system includes one or more data layer, semantic layer, and presentation layer for use with a data warehouse that includes, for each tenant of the system:
      a customer schema associated with their enterprise data environment, and
      a shared data analytics schema which can be updated by an extract, transform, and load process;
   wherein the data layer includes a data pipeline or process operable to extract and transform the enterprise data for loading into a customer schema of a data warehouse instance, said enterprise data including a plurality of position attributes, a set of which can be selectively matched as position requirements with a plurality of candidate attributes, wherein data indicative of the position attributes and the candidate attributes is stored as a plurality of tables of data within the enterprise database of the data analytics system, and wherein the data indicative of the position attributes and the candidate attributes and stored as the plurality of tables of data is used as inputs to a position/candidate matching process;
   wherein the semantic layer includes a definition of a semantic model of a customer's data as metadata that defines schemas, mappings, and/or other constructs that implement aspects of the semantic model;

wherein the presentation layer provides access to data content using one or more of a software analytic application, user interface, dashboard, key performance indicators, or other type of report or interface; and wherein the system operates the position/candidate matching process to match a set of position requirements with candidate attributes or skillsets for a plurality of candidates, ranking them on the basis of match scores, including wherein the position/candidate matching process operates, in response to a request received via a client application and user interface, and communicated to the data analytics system, to:

retrieve, via the data layer, from the enterprise database, an appropriate dataset using select statements or instructions, for use in generating and returning requested data analytics or visualization information to the client;

transform position requirements and candidate skills to semantic vector representations;

compute, for each candidate of a plurality of candidates, based on a similarity assessment of the semantic vector representations, a match score for that candidate;

compute, for each candidate of the plurality of candidates, a skill gap score for that candidate, for use in determining a skill gap between the position requirements and candidate attributes or skillsets, or recommending skills to be augmented to address the position requirements; and generate, for display at a user interface or dashboard via the presentation layer, in connection with the profile matching, one or more gap scores, upskilling recommendations, or other profile matching information, as a two-dimensional matrix, table, chart, or other data display or visualization format.

2. The system of claim 1, wherein the system is used to score match between position or job requirements and candidate person skills considering semantics and syntactic intricacies of natural language.

3. The system of claim 2, wherein the system is used to recommend skills a particular candidate person should upgrade in order to be suitable for a particular position or job.

4. The system of claim 3, wherein the system recognizes and accounts for hierarchical attributes within the candidate person skills.

5. The system of claim 4, wherein the system is used to identify instance in which there is a mis-fit between position or job requirements and candidate person skills.

6. A method for use by a computer with enterprise data for profile matching and generating gap scores and upskilling recommendations, comprising:

accessing a data analytics system, including a computer device hardware comprising a processor and memory, that provides access to an enterprise database of enterprise data, including data descriptive of position requirements and candidate attributes or skillsets within an organization;

wherein the data analytics system includes one or more data layer, semantic layer, and presentation layer for use with a data warehouse that includes, for each tenant of the system:

a customer schema associated with their enterprise data environment, and a shared data analytics schema which can be updated by an extract, transform, and load process;

wherein the data layer includes a data pipeline or process operable to extract and transform an enterprise data for loading into a customer schema of a data warehouse instance, said enterprise data including a plurality of position attributes, a set of which can be selectively matched as position requirements with a plurality of candidate attributes, wherein data indicative of the position attributes and the candidate attributes is stored as a plurality of tables of data within the enterprise database of the data analytics system, and wherein the data indicative of the position attributes and the candidate attributes and stored as the plurality of tables of data is used as inputs to a position/candidate matching process;

wherein the semantic layer includes a definition of a semantic model of a customer's data as metadata that defines schemas, mappings, and/or other constructs that implement aspects of the semantic model;

wherein the presentation layer provides access to data content using one or more of a software analytic application, user interface, dashboard, key performance indicators, or other type of report or interface; and operating by the system the position/candidate matching process, including matching a set of position requirements with candidate attributes or skillsets for a plurality of candidates, ranking them on the basis of match scores, including wherein the position/candidate matching process operates, in response to a request received via a client application and user interface, and communicated to the data analytics system, to:

retrieve, via the data layer, from the enterprise database, an appropriate dataset using select statements or instructions, for use in generating and returning requested data analytics or visualization information to the client;

transform position requirements and candidate skills to semantic vector representations;

compute, for each candidate of a plurality of candidates, based on a similarity assessment of the semantic vector representations, a match score for that candidate;

compute, for each candidate of the plurality of candidates, a skill gap score for that candidate, for use in determining a skill gap between the position requirements and candidate attributes or skillsets, or recommending skills to be augmented to address the position requirements; and generate, for display at a user interface or dashboard via the presentation layer, in connection with the profile matching, one or more gap scores, upskilling recommendations, or other profile matching information, as a two-dimensional matrix, table, chart, or other data display or visualization format.

7. The method of claim 6, wherein the method is used to score match between position or job requirements and candidate person skills considering semantics and syntactic intricacies of natural language.

8. The method of claim 7, wherein the method is used to recommend skills a particular candidate person should upgrade in order to be suitable for a particular position or job.

9. The method of claim 8, wherein the method recognizes and accounts for hierarchical attributes within the candidate person skills.

10. The method of claim 9, wherein the method is used to identify instance in which there is a mis-fit between position or job requirements and candidate person skills.

11. A non-transitory computer readable storage medium having instructions thereon, which when read and executed by a computer cause the computer to perform a method comprising:

accessing a data analytics system, including a computer device hardware comprising a processor and memory, that provides access to an enterprise database of enterprise data, including data descriptive of position requirements and candidate attributes or skillsets within an organization;

wherein the data analytics system includes one or more data layer, semantic layer, and presentation layer for use with a data warehouse that includes, for each tenant of the system:

a customer schema associated with their enterprise data environment, and a shared data analytics schema which can be updated by an extract, transform, and load process;

wherein the data layer includes a data pipeline or process operable to extract and transform an enterprise data for loading into a customer schema of a data warehouse instance, said enterprise data including a plurality of position attributes, a set of which can be selectively matched as position requirements with a plurality of candidate attributes, wherein data indicative of the position attributes and the candidate attributes is stored as a plurality of tables of data within the enterprise database of the data analytics system, and wherein the data indicative of the position attributes and the candidate attributes and stored as the plurality of tables of data is used as inputs to a position/candidate matching process;

wherein the semantic layer includes a definition of a semantic model of a customer's data as metadata that defines schemas, mappings, and/or other constructs that implement aspects of the semantic model;

wherein the presentation layer provides access to data content using one or more of a software analytic application, user interface, dashboard, key performance indicators, or other type of report or interface; and operating by the system the position/candidate matching process, including matching a set of position requirements with candidate attributes or skillsets for a plurality of candidates, ranking them on the basis of match scores, including wherein the position/candidate matching process operates, in response to a request received via a client application and user interface, and communicated to the data analytics system, to:

retrieve, via the data layer, from the enterprise database, an appropriate dataset using select statements or instructions, for use in generating and returning requested data analytics or visualization information to the client;

transform position requirements and candidate skills to semantic vector representations;

compute, for each candidate of a plurality of candidates, based on a similarity assessment of the semantic vector representations, a match score for that candidate;

compute, for each candidate of the plurality of candidates, a skill gap score for that candidate, for use in determining a skill gap between the position requirements and candidate attributes or skillsets, or recommending skills to be augmented to address the position requirements; and generate, for display at a user interface or dashboard via the presentation layer, in connection with the profile matching, one or more gap scores, upskilling recommendations, or other profile matching information, as a two-dimensional matrix, table, chart, or other data display or visualization format.

12. The non-transitory computer readable storage medium of claim 11, wherein the system is used to score match between position or job requirements and candidate person skills considering semantics and syntactic intricacies of natural language.

13. The non-transitory computer readable storage medium of claim 12, wherein the system is used to recommend skills a particular candidate person should upgrade in order to be suitable for a particular position or job.

14. The non-transitory computer readable storage medium of claim 13, wherein the system recognizes and accounts for hierarchical attributes within the candidate person skills.

15. The non-transitory computer readable storage medium of claim 14, wherein the system is used to identify instance in which there is a mis-fit between position or job requirements and candidate person skills.

16. The system of claim 1, wherein the position/candidate matching process operates to:

pre-process position requirements, and candidate skills;

transform position requirements and candidate skills to semantic vector representations;

compute, for each candidate of a plurality of candidates, a match score for that candidate;

compute, for each candidate of the plurality of candidates, a skill gap score for that candidate; and generate profile matching information or data visualizations, and/or optionally determining, for one or more candidates, upskilling requirements for use in providing upskilling recommendations.

17. The system of claim 1, wherein the natural language description of position requirements and candidate attributes are pre-processed to remove unwanted whitespaces, unwanted characters, or invalid content values.

18. The system of claim 1, wherein the system operates to transform both the set of position requirements, and one or more candidate attributes or skills, to semantic vector representations or embeddings, including a position requirements in a vector space representation, and a candidate attributes in a vector space representation, for use in applying a similarities function.

19. The system of claim 1, wherein an attribute match score is computed as an average of maximum similarities of each position profile attribute value requirements over all candidate attribute values, wherein a similarity between two values is evaluated as the cosine between their semantic vector representations.

* * * * *